United States Patent [19]

Bender et al.

[11] Patent Number: 5,405,932
[45] Date of Patent: Apr. 11, 1995

[54] OIL-SOLUBLE, PHENOLIC RESIN-MODIFIED NATURAL RESINIC ACID ESTERS, PROCESSES FOR THEIR PREPARATION AND THEIR USE AS SELF-GELLING PRINTING INK RESINS

[75] Inventors: Albert Bender, Mainz; Walter Hilker, Taunusstein; Lothar Bothe, Mainz, all of Germany

[73] Assignee: Hoechst AG, Germany

[21] Appl. No.: 184,565

[22] Filed: Jan. 21, 1994

Related U.S. Application Data

[63] Continuation of Ser. No. 970,264, Nov. 2, 1992, abandoned.

[30] Foreign Application Priority Data

Nov. 4, 1991 [DE] Germany .................. 41 36 316.7

[51] Int. Cl.$^6$ .................. C08G 63/133; C09D 11/00
[52] U.S. Cl. .................. 528/104; 525/54.45; 525/132; 525/133.5; 525/134; 525/416; 525/480; 525/534; 528/92; 528/106; 528/107; 528/110; 528/111.5; 528/112; 528/176; 528/205; 528/295.5; 527/600; 106/20 R
[58] Field of Search .............. 525/54.45, 132, 133.5, 525/134, 416, 480, 534; 528/92, 104, 106, 107, 110, 111.5, 112, 176, 205, 295.5; 527/600; 106/20 R Primary Examiner—Samuel A. Acquah
Attorney, Agent, or Firm—Bierman and Muserlian

[57] ABSTRACT

Oil-soluble, phenolic resin-modified natural resinic acid esters, which are able to form self-gelling mineral oil solutions and in the form of gel varnishes can advantageously be used as binder resins in printing inks for offset printing and letterpress printing, and also processes for their preparation from natural resins, phenols, aldehydes, condensation catalyst, esterifying agents and modifiers by reaction of the components at temperatures in the range from 80° to 300° C., individual components preferably being initially introduced and the other components being metered in, the combined use of a magnesium compound as condensation catalyst and the continuous removal of the water of reaction during the condensation reaction by azeotropic distillation with co-use of an inert organic solvent as distillative entraining agent being necessary and decisive for the self-gelling property of the process product.

6 Claims, No Drawings

OIL-SOLUBLE, PHENOLIC RESIN-MODIFIED NATURAL RESINIC ACID ESTERS, PROCESSES FOR THEIR PREPARATION AND THEIR USE AS SELF-GELLING PRINTING INK RESINS

PRIOR APPLICATION

This application is a continuation of U.S. patent application Ser. No. 970,264, filed Nov. 2, 1992, now abandoned.

The invention relates to oil-soluble, phenolic resin-modified natural resinic acid esters which form self-gelling mineral oil solutions and can advantageously be used as offset printing ink resins, as well as to processes for their preparation from natural resins, phenols, aldehydes, esterifying agents and modifiers.

As is known, offset printing inks can be prepared by pigmenting a varnish, it being possible to obtain the varnish by dissolving suitable binder resins in mineral oil and adding various auxiliaries. Suitable auxiliaries for improving the binder properties, for example the gloss and the scuff resistance of the printing film, are, for example, vegetable oils, alkyde resins, waxes and optionally further additives. In order to reduce the tack, which is a criterion for the dye-transfer characteristics of the offset printing ink, it is advantageous to convert the varnishes into so-called gel varnishes using gel-forming agents. What can be achieved as a result of the gel structure is that the raster points are advantageously sharply printed and, when the mineral oil is knocked away, there is no bleeding and thus no blurring of the printed image, which is important in particular when the running speeds of the printing machines are high.

For gel formation, aluminum compounds are usually added to the resin solutions. However, it is known that the reaction characteristics of the compounds with the binder resins dissolved in mineral oil are not easy to control and depend, inter alia, both on the type of resin and on the mixing temperature. It is also frequently necessary to prepare the desired gel varnish in a separate process step. To this end, the binder resin is dissolved at elevated temperature in the mineral oil component to be used, usually at 160° to 180° C., the gel-forming agent is added and the solution is then cooled to room temperature. However, in the case of highly reactive gel-forming agents, such as, for example, aluminum alcoholates, initially a lower temperature than that previously maintained for dissolving the resin in mineral oil is required when mixing them in, in order to achieve controlled gel formation. Less reactive aluminum compounds, such as, for example, aluminum chelates, for example aluminum alcoholates modified with ethyl acetoacetate, are also advantageously added at a lower temperature, in order to avoid undesired and premature reactions with the dissolved resin, which can lead to agglomeration. After the gel-forming agent has dissolved, the temperature of the resin solution must then be raised again to 180° C. and then cooled again to room temperature, in order to achieve the desired gel formation. Temperatures which are too high (>180° C.) are generally disadvantageous and can lead to destruction of the gel. From the energy standpoint, this heating and cooling process is unfavorable and precise temperature control is required when reacting the aluminum compounds with the resin, so that the tack of the resulting gel is not modified in an undesired manner. Binder resins which have inadequate compatibility with mineral oil can remain of low compatibility, or even become even more incompatible, even after gel formation with the mineral oil used. In order to prevent them then precipitating from the solution, solubilizing agents, such as, for example, vegetable oils or alkyde resins or long-chain, high-boiling alcohols can be co-used. On the other hand, as is known additives of this type can, however, lead to adverse delays in drying of the printing film.

The preparation of offset printing inks could be substantially simplified if it were possible to use self-gelling synthetic resins which have a good compatibility with mineral oil and are capable of forming the desired stable gel varnish by simple dissolving in mineral oil or vegetable oils or mixtures of such oils, without additional reaction with aluminum compounds. However, no possibilities in this regard have been disclosed hitherto and it has also already been presumed in specialist circles that such possibilities would appear not to be achievable at all, since all efforts hitherto led to partially or completely irreversible crosslinking of the resins, but not to reversible gel formation.

The object on which the present invention was based is, thus, to provide synthetic resins which have the target advantages without the abovementioned disadvantages.

It has now been found, surprisingly, that synthetic resins which have self-gelling properties in mineral oil solutions and are advantageously usable as binder resins for the preparation of offset printing inks can be obtained by using magnesium compounds in the preparation of offset printing ink resins based on phenolic resin-modified natural resinic acid esters as catalyst for the resol formation from phenols and aldehydes in the natural resin melt and for the natural resinic acid esterification, and by removing the water formed during the condensation reaction and the natural resinic acid esterification by azeotropic distillation with co-use of an inert organic solvent capable of forming an azeotrope with water. The synthetic resins resulting from this process have good solubilities in mineral oil and their solutions in mineral oil are surprisingly reversibly self-gelling without additional gel-forming agents and form no irreversible crosslinking.

The preparation of phenolic resin-modified natural resinic acid esters which are not self-gelling in mineral oil solutions, and their use with gel-forming agents in printing inks for offset printing, are known and can be effected in accordance with known methods. They can be obtained by reacting phenols with aldehydes in natural resin melts with co-use of esterifying agents and catalysts, and modified by reaction with α,β-ethylenically unsaturated carboxylic acids, fatty acids or ethylenically unsaturated hydrocarbon resins.

Preferred starting components for the preparation, by known methods, of known phenolic resin-modified natural resinic acid esters which are not self-gelling in mineral oil solutions are the following substance groups A) to G):

A) natural resins or natural resinic acids, preferably colophony, root resin, tall resin and disproportionated or partially hydrogenated or dimerized natural resin of any origin. Frequently, mixtures of natural resins or natural resinic acids and α,β-ethylenically unsaturated carboxylic acids or their anhydrides, in particular fumaric acid, maleic acid, maleic anhydride, itaconic acid, cinnamic acid, acrylic acid or methacrylic acid, or their reaction products, are advantageously used, B) mononuclear or polynuclear phenols, preferably those which are polyfunctional with respect to oxo compounds, in particular phenol, ($C_1$–$C_{12}$)-alkylphenols, arylphenols or aralkylphenols, cresols, 1,3,5-xylenols, isopropylphenol, p-tert-butylphenol, amylphenol, octylphenol, nonylphenol, diphenylolpropane, phenylphenol, cumylphenol and also addition products of phenols and ethylenically unsaturated monomers, preferably styrene, α-methylstyrene, α-chlorostyrene, vinyltoluene and cyclopentadiene, C) aldehydes or aldehyde acetals, preferably aliphatic ($C_1$–$C_7$)-aldehydes, in particular formaldehyde in its diverse monomer, oligomer and polymer forms, acetaldehyde, butyraldehyde, isobutyraldehyde and also benzaldehyde, furfurol and glyoxal, as well as, optionally, phenol resols prepared from components of substance groups B) and C), D) esterifying agents, containing polyhydroxy groups, for esterification of the reaction products of phenolic resins and natural resins or natural resinic acids, preferably polyfunctional alcohols, in particular bifunctional alcohols, for example glycols, or trifunctional alcohols, for example trimethylolethane, trimethylolpropane or glycerol, or tetrafunctional alcohols, for example pentaerythritol, or pentafunctional alcohols, for example dimerized trimethylolpropane, or hexafunctional alcohols, for example dimerized pentaerythritol, E) condensation catalysts, inter alia for resol formation from phenols and aldehydes or aldehyde acetals as well as for the esterification reactions, preferably metal, in particular calcium, magnesium or zinc, oxides, hydroxides, carbonates or acetates, and also amines, for example triethylamine, F) fatty acids for resin modification, preferably animal or vegetable fatty acids or fatty acids obtained by refining, and also fatty acid compounds, for example fats and fatty acid glycerol esters, in particular in the form of vegetable or animal oils, for example tall oil, cotton seed oil, soya oil, safflower oil, castor oil, linseed oil, wood oil or fish oil, and G) ethylenically unsaturated hydrocarbon resins for resin modification, preferably polymers or oligomers of mono- and/or poly-ethylenically unsaturated ($C_5$–$C_9$)-hydrocarbons, in particular from the group comprising isoprene, cyclopentadiene, indene, cumarone and styrene.

The reaction of components A) to E) and optionally F) and G) can be carried out in a known manner by heating component mixtures in the desired proportions, either by the one-pot process or by successive metering of individual components into previously introduced natural resin or natural resinic acid components, which have been brought to the reaction temperature, and stepwise heating from about 80° C. up to temperatures of 300° C., directly distilling off the water of reaction formed and achieving low acid numbers in the resulting resin. None of the oil-soluble, phenolic resin-modified natural resinic acid esters disclosed hitherto and prepared by known processes are able to form self-gelling mineral oil solutions and their solutions in mineral oil may gel only after the addition of specific gelling agents or gel-forming agents, for which purpose aluminum compounds are conventionally used and these compounds are dissolved in the mineral oil solution of the resin with heating to about 180° C. and the solution is then cooled again to room temperature. The solution gels on cooling to room temperature and in general the resulting gel can not reversibly be dissolved by raising the temperature and again be obtained as a gel of the same quality on cooling. On the contrary, irreversible crosslinking frequently occurs, which leads to turbidity of the mineral oil solution as a result of insoluble constituents from the resin and the gel-forming agent and to lowering of the gel viscosity. The sensitivity of the gel viscosity to temperature fluctuations is also considerable and can frequently lead to breakdowns and losses when the gels are used as binders in offset printing inks.

The invention therefore relates to oil-soluble, phenolic resin-modified natural resinic acid esters which are able to form self-gelling mineral oil solutions and are obtained from components from the substance groups comprising A) natural resins or natural resinic acids and optionally their mixtures or reaction products with α,β-ethylenically unsaturated carboxylic acids or their anhydrides, B) mononuclear or polynuclear alkylolizable phenols, preferably phenols which are polyfunctional with respect to oxo compounds, C) aldehydes or aldehyde acetals, preferably aliphatic ($C_1$–$C_7$)-aldehydes, it being possible for components B) and C) optionally also to be used or co-used as separately prepared condensation products in a phenol resol form, D) polyfunctional aliphatic, cycloaliphatic or aromatic-aliphatic alcohols, E) condensation catalysts, F) optionally, fatty acids or fatty acid compounds and G) optionally, ethylenically unsaturated hydrocarbon resins, by reaction of the components in solution or preferably in bulk at temperatures in the range from 80° to 300° C., preferably 90° to 280° C. and in particular 140° to 260° C., either the entire mixture of all components used being reacted or individual components being initially introduced and the others being reacted by metering in, wherein, preferably under an inert blanketing gas atmosphere, 1) natural resins or natural resinic acids from substance group A) are reacted at a temperature of between 90° and 250° C., preferably 140° to 200° C., with α,β-ethylenically unsaturated carboxylic acids or their anhydrides from substance group A), the reaction product 2) is mixed with a magnesium compound from substance group E) and the phenolic component from substance group B) is added to the molten mixture at a temperature of between 100° and 250° C., preferably 110° to 160° C., the aldehyde component from substance group C) is then introduced at the same temperature and reacted with resol formation, preferably under a pressure of between 1 and 10 bar, in particular 1 to 5 bar, 3) the polyol component from substance group D) is then admixed to the reaction product at a temperature of between 190° and 280° C., preferably 230° to 260° C., and optionally the fatty acid component from substance group F) and also optionally the hydrocarbon resin component from substance group G) are admixed at one or more of the steps 3), 2) or 1), and 4) an inert organic solvent capable of acting as entraining agent for the azeotropic distillation of water at the reaction temperature is added to the reaction mixture, at temperatures of between 200° and 280° C., preferably 220° to 270° C. and in particular 240° to 260° C., the water of reaction formed is distilled continuously as an azeotrope and removed from the reaction mixture via a water separator, the entraining agent optionally preferably being circulated, the azeotropic distillation is continued until the formation of water of reaction has ended and the resin formed has an acid number of below 50 mg KOH/g of resin, preferably of below 30 mg KOH/g of resin, the entraining agent is then removed by distillation, initially under normal pressure and at the end under vacuum at pressures of between 1000 and 0.1 mbar, preferably 200 to 50 mbar, and temperatures of up to 300° C., preferably of up to 280° C., the reaction mixture is cooled to room temperature and the phenolic resin-modified natural resinic acid ester is obtained as solid resin, or 5) optionally, a relatively small amount of a high-boiling mineral oil is dissolved in the resin melt freed from entraining agent, before said melt has cooled, the solution is cooled to room temperature and the resin is obtained in solid, mineral oil-containing gel form.

The invention also relates to a process for the preparation of the above-described oil-soluble, phenolic resin-modified natural resinic acid esters, which are able to form self-gelling mineral oil solutions, from natural resins, phenols, aldehydes, catalysts, esterifying agents and modifiers, wherein the reaction of the reactants is carried out as described above and the process product is isolated.

In the case of the preparation, according to the invention, of binder resins which are based on phenolic resin-modified natural resinic acid esters and are self-gelling in mineral oil solutions it is of fundamental importance that a magnesium compound is used as condensation catalyst in process step 2) and an inert organic solvent capable of azeotropic distillation of water at the reaction temperature is used as entraining agent for azeotropic distillation of the water of reaction in process step 4) and the water of reaction is cycled out, and removed, from the reaction mixture by continuous azeotropic distillation. Only the combination of the two measures leads, surprisingly, to a binder resin which is self-gelling in mineral oil solutions, in contrast with which a self-gelling end product does not result when only one of these measures is used in isolation. In the case of the combined use, according to the invention, of both measures, on the other hand, a synergistic effect is apparently achieved, which was neither known nor foreseeable and was extremely surprising and unexpected.

In the reaction, according to the invention, of components A) to G) with co-use of an azeotrope-forming entraining agent in accordance with the abovementioned process steps 1) to 5), the proportion of the individual components, based on the total amount (=100% by weight) of all components, is preferably 1) 20 to 80% by weight, preferably 30 to 75% by weight and in particular 35 to 60% by weight of natural resins or natural resinic acids from substance group A) and 0.1 to 5% by weight, preferably 2 to 4% by weight, of α,β-ethylenically unsaturated carboxylic acids or their anhydrides from substance group A), 2) 0.01 to 2% by weight, preferably 0.3 to 1% by weight and in particular 0.4 to 0.8% by weight, calculated as MgO, of magnesium compounds from substance group E), 10 to 45% by weight, preferably 15 to 40% by weight and in particular 20 to 35% by weight of phenolic components from substance group B) and 2 to 20% by weight, preferably 3 to 10% by weight and in particular 5 to 8% by weight of aldehyde components from substance group C), or, optionally, in place of the components from substance groups B) and C), or pro rata with the latter, up to 45% by weight of condensation products in a phenol resol form prepared separately from compounds of substance groups B), C) and E), 3) 1 to 20% by weight, preferably 3 to 15% by weight and in particular 5 to 10% by weight of polyol components from substance group D), 0 to 30% by weight, preferably 3 to 15% by weight and in particular 5 to 10% by weight of fatty acid components from substance group F), and 0 to 30% by weight, preferably 1 to 25% by weight and in particular 2 to 10% by weight of hydrocarbon resin components from substance group G), 4) 1 to 20% by weight, preferably 3 to 15% by weight and in particular 4 to 10% by weight of inert entraining agent and 5) 0 to 15% by weight, preferably 3 to 10% by weight and in particular 5 to 8% by weight of high-boiling mineral oil.

Compounds of substance groups A) to G) which can preferably be used are:

In respect of A) Natural resins or natural resinic acids, in particular, for example, colophony (tree resin), root resin, tall resin and natural resins which are partially hydrogenated, disproportionated or dimerized. The resins or resinic acids optionally have a bromine number (=amount of bromine taken up in g per 100 g of resin) in the range of preferably 200 to 280 and an acid number in the range of preferably 100 to 300 mg KOH/g of resin;

α,β-ethylenically unsaturated carboxylic acids or carboxylic acid anhydrides, preferably aliphatic carboxylic acids having 3 to 22 carbon atoms, in particular, for example, fumaric acid, maleic acid, maleic anhydride, itaconic acid, cinnamic acid or acrylic acid. Maleic anhydride is particularly preferred;

In respect of B) The phenols described above in connection with the prior art can be used. Preferred phenols are monofunctional and difunctional, in particular difunctional, phenols, i.e. those in which one or two of the ortho- or para-positions with respect to the phenolic OH group on the benzene ring are reactive and capable of aldehyde addition. Trifunctional phenols, such as, for example, phenol, or tetrafunctional phenols, such as, for example, diphenylolpropane, can also be used in minor amounts together with monofunctional and/or difunctional phenols, in which case the proportion of trifunctional or tetrafunctional phenols should preferably not be more than 20% by weight, based on the total amount of phenols employed. The desired compatibilities of the resins according to the invention with aliphatic hydrocarbons and with mineral oils can be achieved very advantageously using the particularly preferred difunctional phenols, such as, for example, alkylphenols and aralkylphenols. The known reaction products of trifunctional phenols with ethylenically unsaturated monomers also have a similar advantageous effect and these reaction products are thus also preferred phenol components. Particularly preferred difunctional phenols are tert-butylphenol, octylphenol and nonylphenol;

In respect of C) All aldehydes and aldehyde acetals known from the conventional phenol resol or phenol resol resin preparation can be used. Formaldehyde is particularly preferred, preferably in the form of its aqueous solutions or in an oligomer form or in solid polymer form, for example in the form of paraformaldehyde; The molar ratio of the phenol component from B) to the aldehyde component for the phenol resol formation can be varied within wide limits and is preferably within the range from 1:0.9 to 1:3.5, in particular 1:1 to 1:2.5; Excess or unreacted aldehyde is removed from the reaction mixture, preferably by distillation. The gelling characteristics of the phenolic resin-modified natural resinic acid esters which are self-gelling in mineral oil solutions and are prepared according to the invention and obtainable as end products can easily be influenced or controlled by the nature and the amount of the starting components used for the phenol resol resin formation, it being possible for the proportion of phenol resol resin components in the self-gelling end product to be preferably up to 45% by weight, based on the end product. The phenol resol resin formation can also be carried out separately, in accordance with known methods, from phenols and aldehydes and basic catalysts, which preferably contain Mg compounds, at temperatures of between 50° and 160° C., preferably 60° to 100° C., under normal pressure or elevated pressure in an autoclave, and the product can then be added to the natural resin or natural resinic acid melt according to the invention in place of corresponding amounts of phenol components from substance group B) and aldehyde components from substance group C). However, the phenol resol resin formation from phenol components and aldehyde components in situ in the natural resin or natural resinic acid melt is preferred;

In respect of D) All compounds which are known from polyester resin preparation and contain polyhydroxy groups can be used as esterifying agents; polyfunctional alcohols are preferred. Glycerol, trimethylolpropane and pentaerythritol are particularly preferred. Pentaerythritol and dimerized pentaerythritol are very particularly preferred;

In respect of E) Magnesium compounds are absolutely essential as condensation catalysts. Magnesium oxides, Mg hydroxides or magnesium salts of weak organic acids, in particular Mg carbonates, Mg bicarbonates, Mg acetates, Mg formates and Mg oxalates, are preferred. Zinc compounds or calcium compounds can also be co-used in minor proportions of up to at most ⅓ equivalent, based on the number of equivalents of the magnesium compound used. If zinc or calcium compounds are used on their own without magnesium compounds the end products resulting from the resin synthesis do not have self-gelling properties in mineral oil solutions, which is extremely surprising;

In respect of F) The fatty acids used are preferably animal or vegetable fatty acids or fatty acid compounds, or fatty acids or fatty acid compounds obtained by refining. The iodine number (=amount of iodine taken up in g per 100 g of fat) of these compounds can preferably be in the range from 50 to 150, and therefore semi-drying and drying oils and fats can preferably be used. Non-drying, i.e. saturated, oils and fats can also be co-used pro rata for resin modification, which has the effect of lowering the iodine number of fatty acid mixtures.

The proportion of fatty acid components optionally participating in the resin synthesis reaction according to the invention, with respect to the self-gelling end products according to the invention which result from the resin synthesis, can preferably be up to 30% by weight. Preferred fatty acid components are, for example, hydrogenated coconut fat, coconut fat, palm oil, shea butter, Japan wax, peanut oil, olive oil, sulfocarbon oil, castor oil, rice oil, cotton seed oil, maize oil, rape oil, soya bean oil, linseed oil, sunflower oil, wood oil, tallow, sperm oil, train oil, wool fat, refinery fatty acids, tall oil, dehydrated castor oil, polymerized oils, such as, for example, so-called linseed oil stand oils, or mixtures of these components;

In respect of G) Suitable ethylenically unsaturated hydrocarbon resins are preferably those containing cyclopentadiene, dicyclopentadiene, cumarone, indene or styrene units in their macromolecules. Their co-use according to the invention in the resin synthesis serves, where appropriate, to influence the end products, which according to the invention are self-gelling in mineral oil solutions, in respect of a lower water uptake of the end product, the hydrocarbon resins optionally being co-used in amounts of preferably up to 30% by weight, based on the self-gelling end product.

Suitable inert entraining agents, which in the preparation of the resins according to the invention are preferably added in step 4) of the synthesis process according to the invention and are able to form azeotropes with water under the reaction conditions, are preferably saturated aliphatic or aromatic hydrocarbons, the boiling points of which under normal pressure are preferably higher than 100° C., for example alkanes, in particular hexane and decane, mixtures of aliphatic hydrocarbons, such as, for example, are present in benzine or in corresponding mineral oil fractions, and also preferably toluene or xylene. The entraining agent is preferably added to the reaction mixture via an inlet tube in the base of the reaction vessel. Small amounts of entraining agent can also already be added in step 1) of the synthesis process according to the invention in order to lower the melt viscosity of the starting components. Preferably, the entire amount of entraining agent is added at the latest on reaching a reaction temperature of 200° C.

It is particularly important according to the invention that the water of reaction formed during the condensation reaction according to the invention is continuously and completely removed from the reaction mixture by azeotropic distillation by means of these entraining agents, the entraining agent preferably being circulated, and that after the removal of water is complete the entraining agent is distilled off from the reaction mixture again and removed. If this condition of continuous and exclusively azeotropic removal of the water of reaction from the cycle is not consistently met, the self-gelling property of the end product can be partly or completely lost and an end product which is no longer according to the invention may result.

In the case of the synthesis process according to the invention comprising the above-described process steps 1) to 5) the progress of the condensation reaction is followed with the aid of the acid number of the reaction mixture. Thus, the acid number of the resin mixture can initially be preferably up to 300 mg KOH/g of resin, determined by conventional methods. It falls continuously as the reaction proceeds with elimination of water and azeotropic removal of water from the cycle and the esterification reaction is continued until the reaction according to the invention has reached the desired end stage and the acid number has fallen to values of <50, preferably <30 mg KOH/g of resin. The entraining agent is then removed from the reaction product by distillation, finally under vacuum. In some cases it can also be advantageous to leave the entraining agent or fractions thereof in the end product, if it dissolves in the end product without problems and does not interfere in or impair the subsequent use of the latter. This can preferably be the case for very high molecular weight resins which have a high melting point, the processability of which can be considerably improved by such a measure in that their melt viscosity and the melting point are lowered and more rapid solubility in mineral oil is made possible.

The gel structure of the resins according to the invention, which are self-gelling in mineral oil solutions, can be characterized by rheological measurements on the particular gels at room temperature or at elevated temperatures. A suitable characterization method in this context is preferably the determination of the viscoelasticity, the measurement of which is carried out using an oscillating rotary viscometer (manufacturer: Haake), the elastic component (=memory modulus G′) and the viscous component (=loss modulus G″) being determined. The G′ and G″ values are measured as a function of the angular velocity ω, given in $[s^{-1}]$, of the oscillating rotary viscometer.

Resins without a gel structure have a substantially viscous behavior and show high G″ values, whereas G′, in comparison with G″, gives relatively low values. As the gel character of the resin increases, the elastic component, and thus the value of G′, increases, whilst the value of G″ becomes lower.

In the literature the quotient G″/G′ is frequently termed tangent delta (tan δ) and used as a criterion for the viscoelasticity. Low tan δ values signify high elasticities or high gel contents and high tan δ values represent low elasticities or low gel contents. Resins which have a high self-gelling capacity therefore have low tan δ values and resins which have a low self-gelling capacity have higher tan δ values. The tan δ value is thus a checkable parameter for a characteristic feature of gellable substances, i.e. of their gellability, and in the present case can advantageously be used as a parameter for characterization of resins according to the invention.

In order to determine the viscoelasticity, the phenolic resin-modified natural resinic acid esters according to the invention, which are self-gelling in mineral oil solutions, are first converted into gels by mixing them for 30 minutes at 180° C. with a standardized mineral oil as test oil in a weight ratio of resin:mineral oil of 1:1.5, the test oil having a boiling range of 240° to 270° C. and an aniline point of 72° C. (standard mineral oil PKW F 4/7, supplier: Haltermann), cooling the mixtures to room temperature, a gel forming from the 40% strength by weight resin solution in mineral oil, and determining the tan δ value of the gel in an oscillating rotary viscometer (RV 20/CV 100 apparatus from Haake using measuring device (cone) PK 20 at 23° C., a deflection angle of 10° and a frequency sweep of 0.05 to 5 Hz).

The invention therefore also relates to oil-soluble phenolic resin-modified natural resinic acid esters which are able to form self-gelling mineral oil solutions and have been obtained by the above-described process according to the invention, wherein their 40% strength by weight solutions in standardized mineral oil (boiling range 240° to 270° C., aniline point 72° C.) form viscoelastic gels which on measurement in an oscillating rotary viscometer at 23° C. in the angular velocity range of $\omega = 1$ to $10 \, s^{-1}$ give tan δ values of preferably <5 and in particular <2.

In order to determine the compatibility of the resins according to the invention, which are self-gelling in mineral oil solutions, with mineral oil, or their solubility in mineral oil to give a clear solution, said resins are in each case dissolved at 180° C. in standardized mineral oil (boiling range 240° to 270° C., aniline point 72° C.) to give 40% strength by weight clear resin solutions, the solutions are cooled to 23° C. and immediately titrated, with stirring, against the same mineral oil until turbidity occurs (cloud point). The ratio of 1 part by weight of resin to X parts by weight of mineral oil present in the solution at the cloud point is designated the compatibility or end point for solubility to give a clear solution.

The invention therefore also relates to oil-soluble, phenolic resin-modified natural resinic acid esters which are able to form self-gelling mineral oil solutions and have been obtained by the above-described process according to the invention, wherein their clear solutions prepared at 180° C. in standardized mineral oil (boiling range 240° to 270° C., aniline point 72° C.) show no turbidity or demixing after cooling to 23° C., in the ratio range of preferably 1 part by weight of resin to 3 to 10 parts by weight of mineral oil.

If other mineral oils are used in place of the standardized test oil used here (=mineral oil PKW F 4/7 from Haltermann, boiling range 240° to 270° C., aniline point 72° C.), the numerical values obtained on determination of the viscoelasticity and the compatibility with mineral oil can change.

The molecular weight of the resins according to the invention, which are self-gelling in mineral oil solutions, can be determined by gel permeation chromatography of the resin solutions in tetrahydrofuran (THF) on polystyrene foam in a permeation measuring apparatus using known methods. According to the measurement results obtained, the molecular weight (weight-average $M_W$) of the resins according to the invention preferably has values of $M_W > 10{,}000$ and has no critical upper limit. However, the molecular weights $M_W$ are particularly preferentially in a medium range between 10,000 and 200,000, in particular 20,000 to 100,000.

The invention also relates to the use of the resins according to the invention, which are self-gelling in mineral oil solutions, as binder resins, preferably in printing inks for offset printing and letterpress printing, where they can be used very advantageously in particular in gel form as gel varnishes. The gel varnishes are preferably prepared using high-boiling mineral oil. The gel varnishes are optionally mixed with further binder resins, such as, for example, phenolic resin-modified colophony resins, vegetable oils, waxes, fillers, desiccants and further additives and the printing inks which can be used for offset printing and letterpress printing are obtained by pigmenting, which printing inks, inter alia at the working temperature fluctuations which arise in printing machines, are substantially insensitive within a very wide range in respect of their viscosity characteristics and also do not become insoluble, which is exceptionally advantageous.

The invention is illustrated in more detail by the following examples.

COMPARISON EXAMPLE 1

Preparation of a binder resin solution (varnish), which is not self-gelling, in mineral oil 40 g of commercially available phenolic resin-modified colophony resin (®Albertol KP 135, manufacturer: Hoechst AG), which has an analytically determined magnesium compounds content of 0.06% by weight, calculated as MgO and based on the resin, in 60 g of a commercially available mineral oil, which has a boiling range of 240° to 270° C. and an aniline point of 72° C. (mineral oil PKW F 4/7 from Haltermann) were heated at 180° C. for 30 minutes under a $N_2$ blanketing gas atmosphere in a heatable stirred apparatus provided with a gas inlet tube and reflux condenser and then cooled to room temperature, an optically clear resin solution of low viscosity which does not have a gel structure and is not self-gelling being obtained. On dilution of the 40% strength by weight resin solution with further mineral oil as a compatibility test or test to determine the solubility to give a clear solution, turbidity arises in the solution at 23° C. from a resin:mineral oil weight ratio of 1:>3.5, which turbidity leads to impairment of the usability of the solution as a varnish and finally can lead to the varnish being unusable.

COMPARISON EXAMPLE 2

Preparation of a gel varnish from a binder resin solution (varnish) which is not self-gelling in mineral oil Comparison Example 1 is repeated except that after heating the components to 180° C. the resulting resin solution is cooled only to 80° C and 0.8 g of a commercially available aluminum chelate, specifically an aluminum isobutylate chelated with ethyl acetoacetate (®Additol VXL 12, Al content about 10% by weight, manufacturer: Hoechst AG), is then added thereto and the mixture is reheated to 180° C. and kept at this temperature for 1 hour. After cooling the mixture to room temperature, a stable solid gel is obtained which gives a tan δ value of 1.5 on measuring its viscoelasticity (measurement in the RV 20/CV 100 apparatus from Haake using the PK 20 measuring device (cone) at 23° C., a deflection angle of 10° and a frequency sweep of 0.05 to 5 Hz).

EXAMPLE 1

Preparation of a phenolic resin-modified natural resinic acid ester binder resin which is self-gelling in mineral oil solution 1054 g of colophony (commercially available colophony WW), which is also termed natural resin or natural resinic acid, are melted under a $N_2$ blanketing gas atmosphere in a heatable 4 l multi-necked flask provided with a stirrer, a thermometer, a filling tube and a reflux condenser, and 50.6 g of maleic anhydride are metered in to the hot resin melt, which is at 160° C., whereupon an exothermic reaction starts, and after this reaction has subsided the reaction mixture is kept at 160° C. for a further 1 hour. 552 g of nonylphenol, 136 g of pentaerythritol and 10.2 g of magnesium oxide (=0.52% by weight, based on the total amount of the starting components) are then added to the mixture at 160° C., the temperature is lowered to 110° C., 155.4 g of paraformaldehyde are added and the mixture is stirred for 1 hour at 110° C. The temperature is then raised to 130° C. in the course of 20 minutes, whereupon the onset of the phenol resol formation starts with the elimination of water, which is discernible from the start of water reflux in the reflux condenser. The reaction temperature is kept at 130° C. for a further 2 hours, the reflux condenser is then combined with an azeotrope water separator and 196 g (=10% by weight, based on the reaction mixture) of benzine, which has a boiling range of 145° to 200° C., are then added via the filling tube to the reaction mixture as entraining agent for the azeotropic removal of water and the water formed during the condensation reaction is cycled out of the reaction mixture and removed by azeotropic distillation. During this step the reaction temperature is raised continuously to 250° C. in the course of 4 hours and water is distilled azeotropically and removed from the cycle continuously until water formation ceases and the reaction mixture has attained an acid number of 23 mg KOH per g of reaction mixture. The entraining agent is then removed from the reaction mixture by distillation at the same temperature or by raising the temperature to 280° C., finally for 30 minutes under vacuum at 60 mbar. The acid number serves as a criterion for the reaction or esterification of the natural resinic acid colophony and of the maleic anhydride units which have reacted with the pentaerythritol in the course of the condensation reaction. After the vacuum distillation is ended, the reaction mixture is cooled to room temperature and 1944 g of solid binder resin are obtained in the form of a glassy solidified melt, which can be converted to a powder and has a melting point of 126° C. In mineral oil having a boiling range of 240° to 270° C., in accordance with the specification given in Comparison Example 1, the binder resin, for example in 40% strength by weight solution after preparation thereof at 180° C. and cooling to room temperature, forms a stable solid gel, the tan δ of which is 1.4, determined as described in Comparison Example 2. The compatibility test or test to determine the solubility to give a clear solution, by dilution of the 40% strength by weight resin solution at 23° C. with further mineral oil, as described in Comparison Example 1, gives a binder resin:mineral oil range in which the resin is soluble to give a clear solution of up to 1:10 parts by weight, i.e. the binder resin obtained has a distinctly better solubility in mineral oil or compatibility with mineral oil than the commercially available binder resin of Comparison Example 1. The average molecular weight $M_W$ of the binder resin is 55,600, determined by gel permeation chromatography on polystyrene in tetrahydrofuran (THF).

COMPARISON EXAMPLE 3

Preparation of a binder resin which is not according to the invention and is not self-gelling in mineral oil solution Example 1 is repeated except that the water of condensation formed during the reaction is distilled off and removed from the reaction mixture without the co-use of an entraining agent. The resulting binder resin has the following properties:

Melting point: 108° C.

The solubility of binder resin:mineral oil to give a clear solution at 23° C. is up to 1:10 parts by weight. The resin is not self-gelling in 40% strength by weight mineral oil solution at room temperature. The average molecular weight $M_W$ of the resin is 15,800.

COMPARISON EXAMPLE 4

Preparation of a binder resin which is not according to the invention and is not self-gelling in mineral oil solution Example 1 is repeated except that instead of 10.2 g of magnesium oxide the equivalent amount of 14.2 g of calcium oxide (=0.72% by weight, based on the total amount of the starting components) is used. The resulting binder resin has the following properties:

Melting point: 102° C.

The solubility of binder resin:mineral oil to give a clear solution at 23° C. is up to 1:10 parts by weight.

The resin is not self-gelling in 40% strength by weight mineral oil solution at room temperature. The average molecular weight $M_W$ of the resin is 21,800.

COMPARISON EXAMPLE 5

Preparation of a binder resin which is not according to the invention and is not self-gelling in mineral oil solution Example 1 is repeated except that instead of 10.2 g of magnesium oxide the equivalent amount of 20.6 g of zinc oxide (=1.04% by weight, based on the total amount of the starting components) is used. The resulting binder resin has the following properties:

Melting point: 103° C.

The solubility of binder:mineral oil to give a clear solution at 23° C. is up to 1:10 parts by weight.

The resin is not self-gelling in 40% strength by weight mineral oil solution at room temperature. The average molecular weight $M_W$ of the resin is 19,300.

EXAMPLE 2

Preparation of a binder resin which is self-gelling in mineral oil solution

Example 1 is repeated in accordance with the process except that commercial soya oil is additionally used as reactant and instead of benzine xylene is used as entraining agent, the detailed procedure being as follows:

157 kg of colophony (commercially available colophony WW), which is also termed natural resin or natural resinic acid, are melted under a $N_2$ blanketing gas atmosphere in a 600 l stirred autoclave and 8.4 kg of maleic anhydride are metered into the hot resin melt, which is at 160° C. After the exothermic reaction has subsided, the reaction mixture is stirred for a further 1 hour at 160° C. 92 kg of nonylphenol, 22.1 kg of pentaerythritol, 33.3 kg of soya oil, 1.9 kg of magnesium oxide (=0.56% by weight, based on the total amount of the starting components) and 23.3 kg of paraformaldehyde are then metered in successively at 160° C., the stirred autoclave is closed pressure-tight and the reaction mixture is heated at 160° C. for 3 hours, an autoclave pressure of 3.5 bar being established. The autoclave is then slowly let down at 160° C. via a pressure relief valve, a reflux condenser provided with a water separator is connected, whereupon a water reflux starts to be established in the reflux condenser, and 33.8 kg of xylene are metered, as entraining agent, via a metering dip tube into the resin melt. The temperature of the reaction mixture is then slowly raised to 260° C., with continuous azeotropic distillation and removal of water from the cycle, and the water of condensation cycled out is continuously removed until the water formation subsides and the acid number of the reaction mixture is 23 g KOH/g of resin. The entraining agent is then distilled off, finally under 100 mbar vacuum and by raising the temperature to 280° C. The reaction mixture is then cooled to room temperature and the binder resin is obtained in the form of a glassy solidified melt which can be converted to a powder. The resin has the following properties:

Melting point: 118° C.

The solubility of binder:mineral oil to give a clear solution at 23° C. is up to 1:10 parts by weight. The binder resin is self-gelling in, for example, 40% strength by weight mineral oil solution and after preparation of the solution at 180° C. and cooling to room temperature forms a stable solid gel, the tan δ of which is 1.4, determined as described in Comparison Example 2. The average molecular weight $M_W$ of the resin is 84,330, determined as described in Example 1.

EXAMPLE 3

Preparation of a binder resin which is self-gelling in mineral oil solution

Example 1 is repeated in accordance with the process except that commercially available soya oil and a commercially available cyclopentadiene resin are additionally used as reactants, the detailed procedure being as follows:

948.6 g of colophony (commercially available colophony WW) and 105.4 g of cyclopentadiene resin (Escorez 8190, manufacturer: Exxon) are melted under a $N_2$ blanketing gas atmosphere in a heatable 4 l multi-necked flask provided with a stirrer, a thermometer, a filling tube and a reflux condenser and 55.7 kg of maleic anhydride are metered into the hot resin melt, which is at 160° C., whereupon an exothermic reaction starts, and after this reaction has subsided the reaction mixture is kept at 160° C. for a further 1 hour. 522 g of nonylphenol, 139.5 g of pentaerythritol, 10.2 g of magnesium oxide (=0.48% by weight, based on the total amount of the starting components) and 180 g of soya oil are then added to the mixture at 160° C., the temperature is lowered to 110° C., 155.4 g of paraformaldehyde are added and the mixture is stirred for 1 hour at 110° C. The temperature is then raised to 130° C. in the course of 20 minutes, whereupon the onset of phenol resol formation starts with the elimination of water, which is discernible from the start of water reflux in the reflux condenser. The reaction is then carried out until the end product is obtained in the same way as described in Example 1. The binder resin, which is obtained in virtually quantitative yield, has a melting point of 106° C. and an acid number of 23 mg KOH/g of resin.

In order to lower its melt viscosity, the resin is mixed, after termination of the entraining agent distillation at 250° C., with 107 g (=5% by weight, based on the resin) of a high-boiling mineral oil, the boiling range of which is 260° to 290° C., and the mixture is stirred for 30 minutes at 250° C. and then cooled to room temperature.

The solubility of binder resin:mineral oil to give a clear solution at 23° C. is up to 1:5 parts by weight. The binder resin mixed with 5% by weight of high-boiling mineral oil is self-gelling, for example in 40% strength by weight mineral oil solution having a boiling range of 240° to 270° C., and after preparation of the solution at 180° C. and cooling to room temperature forms a stable solid gel, the tan δ of which is 1.0, determined as described in Comparison Example 2. The average molecular weight $M_W$ of the resin is 105,740, determined as described in Example 1.

EXAMPLE 4

Preparation of a binder resin which is self-gelling in mineral oil solution

Example 1 is repeated in accordance with the process except that a commercially available cyclopentadiene resin is additionally used as reactant and the reaction temperature during the condensation and esterification phase is now raised to 270° C. instead of to 250° C. In detail, the following amounts of reactants are used:

949 g of colophony (commercially available colophony WW)

105 g of cyclopentadiene resin (Escorez 8190, manufacturer: Exxon)

50.6 g of maleic anhydride
552 g of nonylphenol
133.4 g of pentaerythritol
12 g of magnesium oxide (=0.61% by weight, based on the total amount of the starting components)
155.4 g of paraformaldehyde
196 g of benzine having a boiling range of 145 to 200° C.

The resulting binder resin, obtained in a yield of 93% of theory, has a melting point of 142° C. and an acid number of 23 mg KOH/g of resin.

The solubility of binder resin:mineral oil to give a clear solution at 23° C. is up to 1:6 parts by weight. The binder resin is self-gelling, for example in 40% strength by weight mineral oil solution having a boiling range of 240° to 270° C., and after preparation of the solution at 180° C. and cooling to room temperature forms a stable solid gel, the tan δ of which is 1.6, determined as described in Comparison Example 2. The average molecular weight $M_W$ of the resin is 95,670, determined as described in Example 1.

EXAMPLE 5

Use of a binder resin which is self-gelling in mineral oil solution to prepare an offset printing ink 36.6 g of the binder resin prepared in Example 1 are dissolved at 180° C. under a $N_2$ blanketing gas atmosphere in 63.7 g of mineral oil, the boiling range of which is 260° to 290° C., in a heatable stirred vessel and the solution is stirred for 30 minutes at 180° C. and then cooled to room temperature, whereupon a stable solid gel (=gel varnish) forms immediately. 17.2 g of this gel varnish, 15.8 g of permanent ruby, 53.5 g of mineral oil having a boiling range of 260° to 290° C. and 13 g of a commercially available phenolic resin-modified colophony resin of low viscosity (Albertol VKP 1385, manufacturer: Hoechst AG) as additional binder resin are dispersed in a three-roll mill. The resulting offset printing ink, which is in paste form, shows very good printing characteristics both in offset printing and in letterpress printing. It has a low tack, i.e. a very good dye-transfer capacity, which leads to very good print sharpness. It is also found that the gel varnish according to the invention has a surprisingly good gel consistency and this gel consistency is substantially insensitive to temperature fluctuations within the customary temperature fluctuation range in printing machines.

COMPARISON EXAMPLE 6

Preparation of an offset printing ink using a binder resin which is not self-gelling in mineral oil solution Example 5 is repeated except that, instead of 17.2 g of gel varnish obtained from the binder resin of Example 1, 17.2 g of a conventional gel varnish of Comparison Example 2, which is not according to the invention and is obtained from binder resin which is not self-gelling, are now used and in other respects the procedure is as described in Example 5.

In the lower to medium printing machine temperature range, the tack of the offset printing ink is comparatively approximately the same as that in Example 5 and the print qualities are also satisfactory. However, the considerable sensitivity of the gel varnish consistency to temperature is a disadvantage, since when the temperature is raised within the conventional printing machine temperature range from the lower or medium range to the upper temperature range the gel consistency can decrease in an uncontrollable manner and lead to poor print quality and damage, in contrast to the gel varnish consistency in Example 5, which is according to the invention and is substantially temperature-stable over a wide temperature range.

We claim:

1. An oil soluble, phenolic resin modified natural resinic acid ester wherein the compounds from groups A) to H) used are
   A) at least one natural resin or natural resinic acid selected from the group consisting of colophony (tree resin), root resin, tall resin and natural resins which are partially hydrogenated, disproportionated or dimerized and have a bromine number in the range from 200 to 280 and an acid number in the range from 100 to 300 mg KOH/g of resin, and
   B) at least one phenol selected from the group consisting of monofunctional, difunctional phenols, trifunctional and tetrafunctional phenols, the proportion of trifunctional or tetrafunctional phenols of no more than 20% by weight, based on the total amount of the phenols employed,
   C) at least one aliphatic ($C_1$–$C_7$)-aldehyde, the molar ratio of the phenol component from B) to the aldehyde component for the formation of a phenol resol being 1:0.9 to 1:3.5,
   D) at least one polyfunctional alcohol selected from the group consisting of glycerol, trimethylolpropane, pentaery-thriol and dimerized pentaerythritol,
   E) at least one condensation catalyst selected from the group consisting of magnesium oxide, magnesium hydroxide, magnesium salts of organic acids, magnesium carbonate and magnesium bicarbonate,
   F) optionally animal or vegetable fatty acids, the iodine number of which is in the range from 50 to 150 selected from the group consisting of semidrying and drying oils and fats, hydrogenated coconut fat, coconut fat, palm oil, shea butter, Japan wax, peanut oil, olive oil, sulfocarbon oil, caster oil, rice oil, cotton seed oil, maize oil, rape oil, soya bean oil, linseed oil, sunflower oil, wood oil, tallow, sperm oil, train oil, wool fat, refinery fatty acids, tall oil, dehydrated castor oil, polymerized oils, linseed oils and mixtures of these components,
   G) optionally ethylenically unsaturated hydrocarbon resins, the macromolecules of which contain units selected from the group consisting of cyclopentadiene, dicyclopentadiene, cumarone, indene and styrene,
   H) α,β-ethylenically unsaturated aliphatic carboxylic acids having 3 to 22 carbon atoms or carboxylic acid anhydrides
by reaction of the components in solution or in bulk at temperatures from 80° to 300° C., the entire mixture of all components being reacted together or individual components being initially introduced and the others being reacted by metering in, wherein,
   1) natural resins or natural resinic acids from group A) are reacted at a temperature of between 90° and 250° C., with α,β-ethylenically unsaturated carboxylic acids of 3 to 22 carbon atoms or their anhydrides from group H), the reaction product
   2) is mixed with a condensation catalyst of group E) and the phenolic component from B) is added to the molten mixture at a temperature of between 100° and 250° C., the aldehyde component from group C) is then introduced at the same temperature and reacted with resol formation, 3) the polyol component from group D) is then added to the reaction product at a temperature of between 190° and 280° C., and optionally the fatty acid component from group F) and optionally the hydrocarbon resin component from group G) are admixed at one or more of the steps 3), 2) or 1), and 4) an inert organic solvent as entraining agent for the azeotropic distillation of water at the reaction temperature is added to the reaction mixture, at temperatures of between 200° and 280° C., the water of reaction formed is distilled continuously as an azeotrope and removed from the reaction mixture via a water separator, optionally circulating the entraining agent, the azeotropic distillation is continued until the formation of water of reaction has ended and the resin formed has an acid number of below 50 mg KOH/g of resin, the entraining agent is then removed by distillation, initially under normal pressure and at the end under vacuum at pressure of between 1000 and 0.1 mbar, and temperatures of up to 300° C. and the reaction mixture is cooled to room temperature and the phenolic resin-modified natural resinic acid ester is obtained as solid resin, or 5) optionally, a small amount of a high-boiling mineral oil is dissolved in the resin melt free from entraining agent, before said melt has cooled, the solution is cooled to room temperature and the resin is obtained in solid, mineral oil-containing gel form.

2. An oil-soluble, phenolic resin-modified natural resinic acid ester, as claimed in claim 1, wherein resinic acid ester clear solutions prepared at 180° C. in standardized mineral oil (boiling range 240° to 270° C., aniline point 72° C.) show no turbidity or demixing after cooling to 23° C. in the ratio range of 1 part by weight of resin to 3 to 10 parts by weight of mineral oil.

3. A printing ink for offset printing and letter press printing containing a resinic acid ester of claim 1 as a binder resin.

4. An oil-soluble, phenolic resin-modified natural resinic acid ester as claimed in claim 1, wherein 40% strength by weight solutions of the oil soluble, phenolic resin-modified natural resinic acid ester in standardized mineral oil (boiling range 240° to 270° C., aniline point 72° C.) form viscoelastic gels which on measurement in an oscillation rotary viscometer at 23° C. in the angular velocity range of $\omega=1$ to $10$ $s^{-1}$ give tan $\delta$ values of $<5$.

5. An oil-soluble, phenolic resin-modified natural resinic acid ester as claimed in claim 1, wherein the molecular weight (weight-average $M_W$) of the oil soluble, phenolic resin-modified natural resinic acid ester is in the range between 10,000 and 200,000.

6. The process for the preparation of oil-soluble, phenolic resin-modified natural resinic acid esters from natural resins, phenols, aldehydes, condensation catalyst, esterifying agents and modifiers as claimed in claim 1, wherein the reaction of the reactants is carried out as described in claim 1 and the process product is isolated, the combined use of process characteristics 2) and 4), the use of a magnesium compound as condensation catalyst and the continuous removal of the water of reaction during the condensation reaction by azeotropic distillation with co-use of an inert organic solvent at the reaction temperature as distillative entraining agent.

* * * * *